F. X. LAUTERBUR.
DOUGH MOLDING MACHINE.
APPLICATION FILED JUNE 13, 1921.

1,432,874.

Patented Oct. 24, 1922.
8 SHEETS—SHEET 2.

INVENTOR:
Frank X. Lauterbur
BY Allen & Allen
ATTORNEYS.

F. X. LAUTERBUR.
DOUGH MOLDING MACHINE.
APPLICATION FILED JUNE 13, 1921.

1,432,874.

Patented Oct. 24, 1922.
8 SHEETS—SHEET 5.

INVENTOR:
Frank X. Lauterbur
BY Allen & Allen
ATTORNEYS.

F. X. LAUTERBUR.
DOUGH MOLDING MACHINE.
APPLICATION FILED JUNE 13, 1921.

1,432,874.

Patented Oct. 24, 1922.
8 SHEETS—SHEET 6.

INVENTOR:
Frank X. Lauterbur
BY Allen & Allen
ATTORNEYS.

Patented Oct. 24, 1922.

1,432,874

UNITED STATES PATENT OFFICE.

FRANK X. LAUTERBUR, OF SIDNEY, OHIO.

DOUGH-MOLDING MACHINE.

Application filed June 13, 1921. Serial No. 477,080.

*To all whom it may concern:*

Be it known that I, FRANK X. LAUTERBUR, a citizen of the United States, and a resident of Sidney, in the county of Shelby and State of Ohio, have invented certain new and useful Improvements in Dough-Molding Machines, of which the following is a full, clear, and exact description, reference being had to the accompanying drawings, forming part of this specification.

My invention relates to dough molding machines, otherwise known as loaf forming machines, in which a quantity of prepared dough is rolled, curled, and kneaded into a loaf of desired size by automatic means.

In a patent granted to me January 4, 1916, No. 1,167,187, I have shown and described a mechanism based in many ways on the same general plan and theory as the present invention, and reference is hereby made to this patent for an explanation of the various functions of such machines and their object.

It is my object to provide a number of improved features over and above my prior machine as above referred to. Thus from the point of introduction of the dough, clear to the end of the operations, I have taken the older machine and added improved features which experience has shown me would result in a simpler, more effective, more widely useful, and more clean and economical machine.

Thus one object of my invention is to improve upon the introduction of dough into the machine by a special scraping device applied to the receiving rolls, which device is to be under the operator's control.

For the dough as it passes to the sheet forming rolls it is my object to provide an adjustment which operates in connection with a calibrated gauge, such that definite instructions can be given to the baker on different styles of work in regulation of the thickness of the sheet.

Then further, the trip devices or trip belt as it is called is improved by me both with respect to the adjustment thereof, to delicate and standard adjustments, and with respect to its removability to give access for cleaning the interior of the machine.

Taking up next the parts which knead the dough, I have as my object the provision of a completely adjustable and widely adaptable mold board structure and a drive and adjustment for the conveyor belt which causes the loaf or coil to travel over the mold board. In this connection, also, I propose to make the pressure board which holds the loaf or coil against the mold board fully adjustable and capable of adjustments which are simple to bring about and operate at various points on the board upon manipulation of a single part by the operator.

It is one of the points of my invention to provide for adjustable side boards in connection with the kneading mechanism, whereby the width of the loaf is to be controlled and the entire method of attachment of the pressure board parts is such that they may be very quickly and easily lifted out of the machine.

With these various objects in view I accomplish the same by that certain construction and arrangement of parts to be hereinafter more specifically pointed out and claimed.

I have generally indicated the framework of the machine as at 1 and the gear box as 2. Within the gear box are gears 3, 3, for the receiving rolls 4, 4. These rolls take the dough from the hopper 5 and pass it into the machine in the form of a sheet. Within the machine the sheet is acted on first to form it into a sheet of the exact desired thickness, next to coil the sheet into a roll or loaf, and finally to knead or work up the loaf and deliver it ready for the usual tempering and baking processes.

Figures 1, 21, 22:
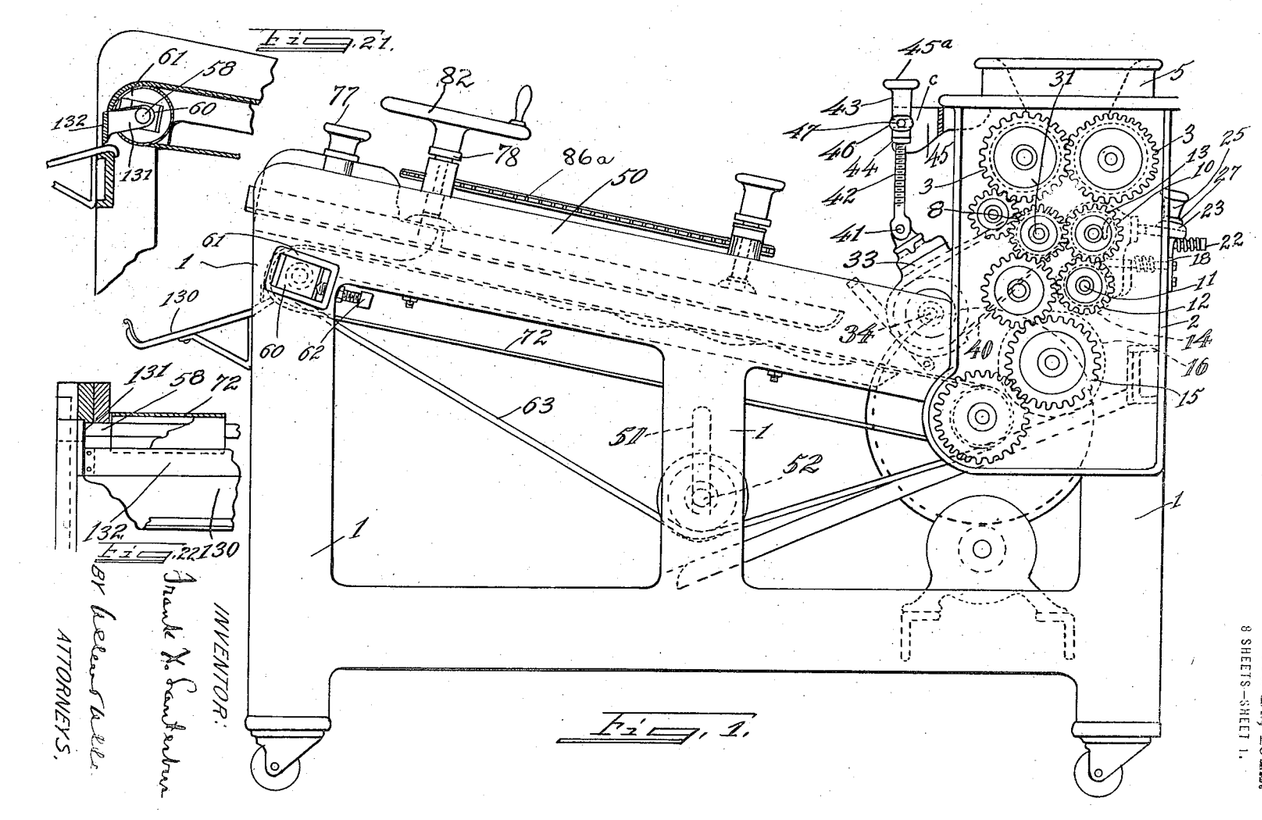
Figure 1 is a side elevation of the complete machine with the cover removed from the gear box and certain of the details and adjustments omitted for purposes of clearness.
Figure 21 (Sheet 1) is a detail section showing the guard strip for protecting the formed loaf in its movement from the kneading devices to the catch pan.
Figure 22 is a detail front elevation of this device.
Figure 2:
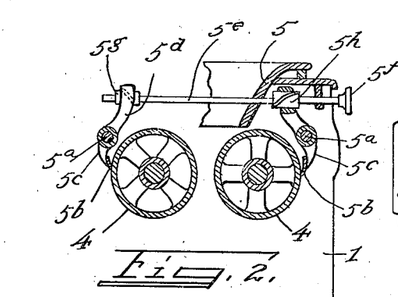
Figure 2 is a detail section taken through the receiving rolls showing the scraper devices.
Figure 3:
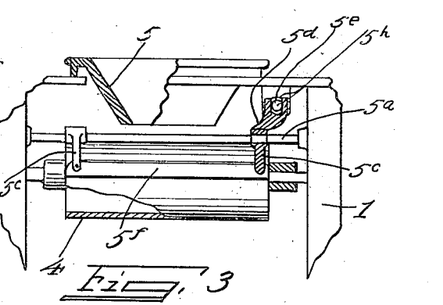
Figure 3 is a side elevation of said parts.
Figure 4:
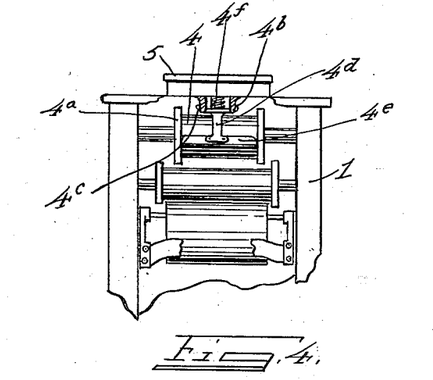
Figure 4 is a side elevation of a modification showing a different form of roll.

As shown in Figures 2, 3, and 4 (but omitted in Figure 1) I provide for scraping the receiving rolls to keep them clear of dough, and in connection with the scraper, when used with non-flanged rolls, I provide means for readily throwing it into and out of operation.

Since dough passes between the rolls there must be a pair of scrapers, for which reason I provide two rock shafts $5^a$ set into the frame 1, which carry scraper blades $5^b$, $5^b$, one for each roll. These blades are carried on arms $5^c$ set over the shafts, one arm of each pair for one blade having an upward extension $5^d$.

In the frame of the machine I mount a rod $5^e$ operated by a head $5^f$, which rod has a pair of collars on it having one a right and one a left hand spiral rib, as shown at $5^g$ and $5^h$.

The extension $5^d$ is formed with bifurcated ends to straddle the collars $5^g$ and $5^h$, said ends being cut with a groove to match the right and left spiral ribs.

Thus the operator, when he wishes to throw on the scrapers, revolves the rod $5^e$ to bring them into contact position where they will remain because of the self-locking action of the spiral thread. To remove the scrapers from contact the rod is turned in the other direction.

In Figure 4 is shown an instances in which the receiving rolls have flanges $4^a$ thereon, in which case I mount brackets $4^b$ beneath the top of the frame, which brackets serve as bearings for the trunnions $4^c$ of arms $4^d$ that support the scraper blades $4^e$. I have also shown springs $4^f$, which bear on lateral extensions on the arms $4^d$ to maintain the scraper constantly in contact with the non-flanged portions of the rolls. I find this imperative in flanged rolls, as noted above.

*The adjustable sheet forming rolls.*

Figure 5:
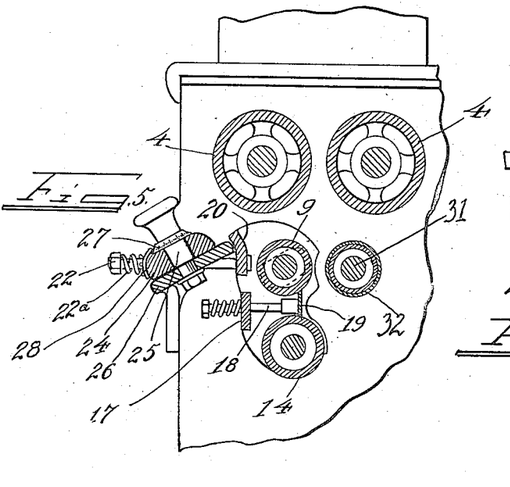
Figure 5 is a detail sectional view showing the receiving rolls and sheet forming rolls, together with the adjustable frame for one of the latter.
Figure 6:
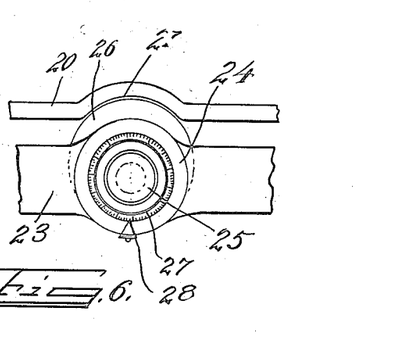
Figure 6 is a side elevation of the parts shown in Figure 5.

The dough passes from the receiving rolls to the sheet forming rolls, which comprise the roll 32 driven by the shaft 31 whose gear 8 is one of the train in the gear box. The other sheet forming roll 9 has its shaft mounted between the arms 10, 10, of a swinging frame. This frame is pivoted on a shaft 11 fixed in the frame of the machine, said shaft carrying a gear 12 that is one of the train of gears in the box. The gear 13 on the shaft of the roll 9 meches in all positions of adjustment with the gear 12, since the frame pivots on the center of said gear 12.

The shaft 11 carries the coil forming roll 14 and a gear 15 drives the shaft of the other coil forming roll 16. By reference to the patent above noted, the operation of the sheet forming rolls and the coil forming rolls will be made clear without special mention here.

It will be noted that on the cross bar 17 of the swinging frame is mounted the supporting rod or rods 18 for a scraper 19, the latter lying between the rolls 9 and 14.

One of the points of this invention lies in the method of adjusting the swinging frame made up of the side arms 10, 10, and the cross bar or bars 17. Thus the frame (Figures 1, 5–7) has a cross member 20, which is formed with a central arc-shaped cut-out 21 and a pair of posts or rods 22.

Figure 7:
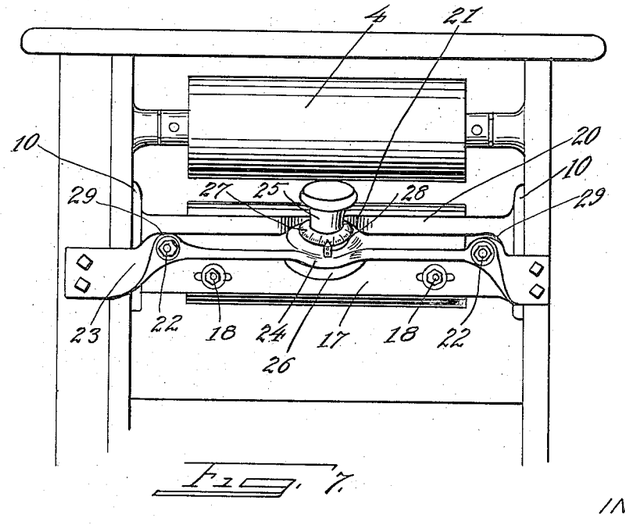
Figure 7 is a perspective view of the adjusting device for the sheet forming roll.

The frame of the machine is supplemented with an inclined bar or strap 23, which has a boss 24 at its central point. A post 25 is mounted revolubly in the boss and carries on the underside of the bar, an eccentric 26, which engages the notch in the swinging frame and imparts movement thereto. This eccentric is made up of a disk, and the post carries a calibrated collar 27 on the upper side of the bar over which extends an indicating finger 28 that is fixed to the boss on the bar 23.

The posts 22 pass through bosses 29, 29, in the bar 23 and are equipped with springs $22^a$ when bent to hold the notch in the swinging frame up against the eccentric.

The power of the springs $22^a$ is such that the eccentric is frictionally held in adjusted position and the motion of the eccentric will permit the frame to swing on its pivotal center or axis. The range of adjustment is less than an inch, so there need be no special devices to compensate for the arcuate movement of the swinging frame.

The position of the frame and thus of the one sheet forming roll with relation to the other may accordingly be easily read on the calibrated scale, so that guess-work will not have to be relied on, and various kinds of work can be done on a carefully pre-arranged basis.

The trip belt.

Referring next to the trip belt (Figures 8 and 9), it should be noted that a frame is provided made up of arms 30, 30, swung from a shaft 31, which carries a roll 32. The arms are connected at their outer ends by means of a frame piece 33 and carry in addition a shaft 34. This shaft is housed in bearings 35, which are made adjustable by means of screws 36, which thread into sockets 37 on the inner face of each arm. These screws have nuts or collars 38 thereon, which cooperate with heads thereof in carrying the said bearings.

Figure 8:
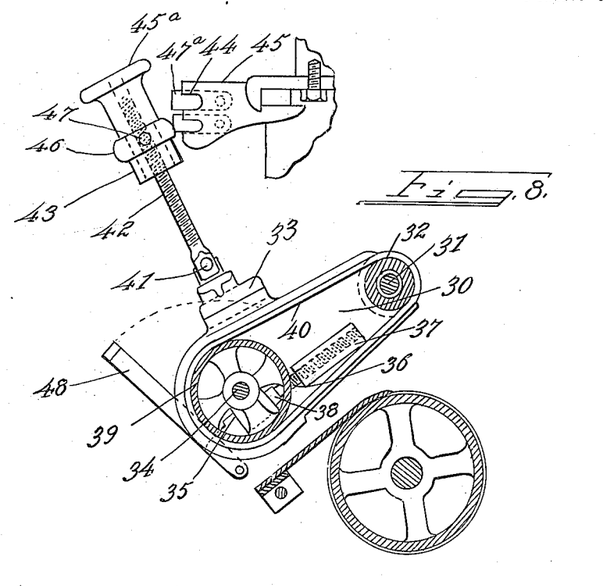
Figure 8 is a detail side elevation showing the adjustment for the trip belt.
Figure 9:
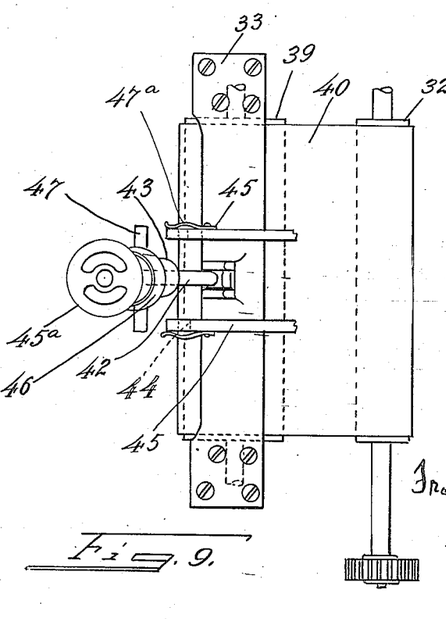
Figure 9 is a top plan view of the trip belt device.

The shaft 34 carries a roll 39 and a belt 40 passes over this roll and the roll 32, said latter roll serving as one of the sheet forming rolls and the belt acting as a facing in this connection. This roll 32 is driven by the gear 7 mounted in the gear case, as has already been mentioned.

Swung on a pivot 41 at the center of the frame piece of the belt frame above described is a screw post 42. This post has threaded on it a nut 43, which has means on it to engage in the notches 44 of a pair of spaced plates 45. These plates are mounted on the main frame above the position of the belt frame and by hooking the nut in one or the other of the set of notches, the position of the belt with relation to the rest of the machine can be controlled.

The nut is made up with a hand wheel or head $45^a$ and carries a loose ring 46 thereon. This ring has radial pins 47 on it which will readily engage in the notches of the supporting plates.

By turning down or up on the nut, the fine adjustments can be accomplished, since the ring is free to remain stationary while the nut revolves. The operator will first select the notch which he desires and then turn the nut until just the right adjustment is made. In ordinary practice, however, the operator having made an adjustment from the lower notched position will usually need to shift between notches for his two main lines of work. The notches are spaced to take care of single and double thickness sheets of dough and thus the necessity for accurate adjustment is done away with in the usual practice in a bakery.

The side of the frame is open, so that the entire belt carrying frame can be swung well up out of the way for cleaning out the machine. When this is done, an arm or arms 48 pivoted on the inside of the main frame can be moved up to a position to sustain the frame in its elevated position.

As can be observed, this adjustment permits of great accuracy and for easy and undisturbed access to the interior of the machine for cleaning.

The springs $47^a$, located alongside the notches in the two plates 45, grasp the ends of the pins and hold them in place, serving as a spring latch which may be forced by withdrawing the structure in the manner in which it was inserted.

Kneading and rolling mechanism drive.

Referring next to the kneading and rolling devices (Figures 10 and 11), it will be noted that there is a bed 50, which is carried on the main frame 1. This frame supports in slots 51 of the frame, a bolt 52, which pivotally supports an idler sprocket 53. This bolt may be set in a variety of positions by loosening and tightening down on the nut 54, which brings the sleeve 55 up against the inside of the frame or releases the clamping action, as desired. The idler is carried on the sleeve.

Figure 10:
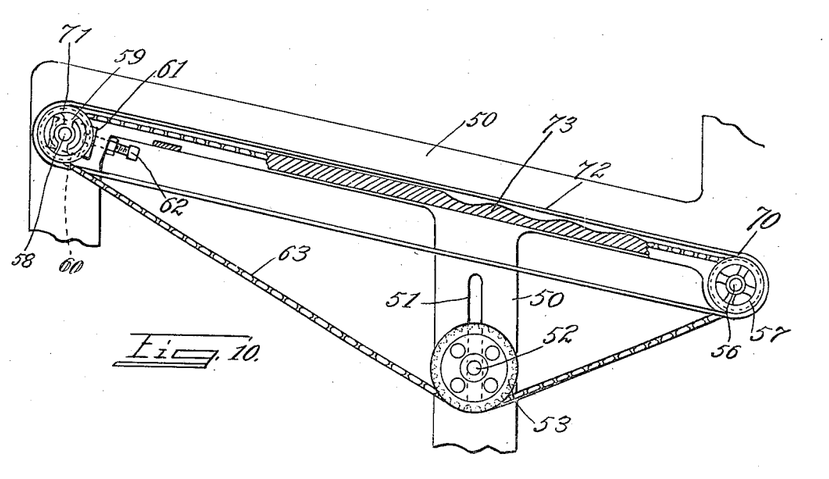
Figure 10 is a detail side elevation showing the belt operating devices.
Figure 11:
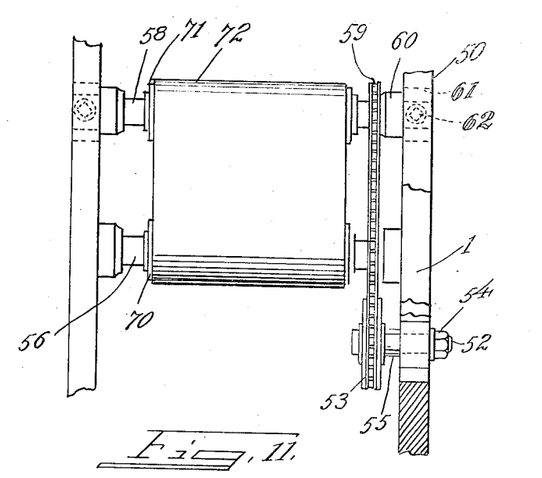
Figure 11 is an end elevation of the parts shown in Figure 10.

There is a fixed shaft 56 carrying a sprocket 57 and in the outer end of the bed 50 is a shaft 58, which carries another sprocket 59. This shaft 58 is mounted in boxes or journals 60, which slide in pockets 61 of the frame under control of screws 62.

A chain 63 passes over the sprockets and the drive is on the sprocket 57, thereby causing the driven parts to be tight on the lower reaches and loose on the upper reaches. Both the sprockets, other than the driving sprocket, can be adjusted with the result of giving just the correct tension on the chain.

As shown, the chain transmits motion from the two shafts to rolls 70 and 71, the spacing of said rolls being controlled by the adjustment to the outer sprocket shaft hitherto described. The belt 72 passes over the rolls and is given a wave-like motion by means of a base-board 73 of the desired conformation against which the belt is forced by the rolls of dough passing along under its influence.

The chain, it is especially important to notice, may be made as tight as desired without affecting the desired adjustment to the belt, since the central idler sprocket controls the chain and not the belt. In my former machine the chain had to be quite loose in order to permit the belt or conveyor to be of the loose tension that is necessary.

*The pressure board.*

It should be noted of the pressure board devices, that I have shown several different forms of board, the simpler form being shown in connection with a new and more simple adjusting device for raising and lowering the board, and several other forms in which the simple form of board is divided into two parts, which are adjustable for width, together with the side boards.

Referring then first to the matter of adjusting whatever board is used vertically and a quickly removable mounting of the board on supporting posts:—

Figure 12:
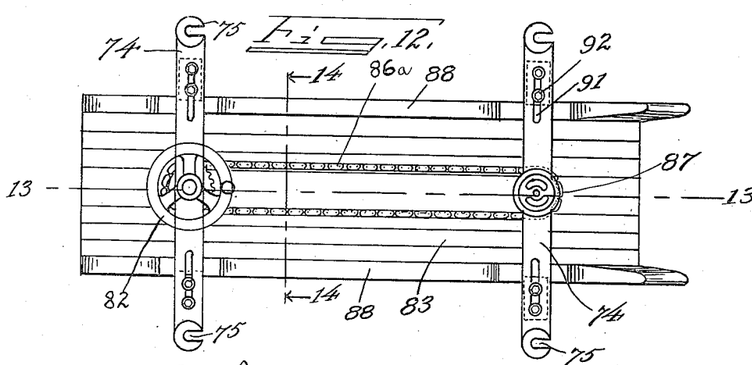
Figure 12 is a top plan view of the reduction unit, also its mounting devices showing a simple form of unit.
Figure 13:
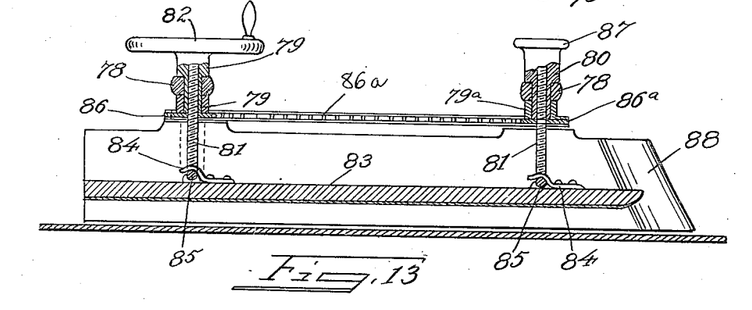
Figure 13 is a vertical section taken through the parts shown in Figure 12 on the line 13—13 thereof.

A pair of metal straps 74, 74, are provided, preferably slightly arched, said straps having slotted ends 75, which engage over bolts 76 set into the slanting bed 50. These straps form the support for the pressure board and can be removed together with the board by loosening the heads 77 of the bolts.

The middle portion of the straps are formed with bosses 78, 78, which revolubly receive the internally threaded sleeves 79 and 80. The threaded posts 81 are secured to the pressure board and pass through the sleeves 79 and 80. The sleeve 79 has a hand wheel 82 thereon for ease of operation, as will be noted.

As a simple means of mounting the pressure board referring to the plain form of board as at 83 (Figures 12 and 13), I mount securely on the upper surface of the board a pair of clips or arched spring leaves 84, and on the lower end of the threaded posts 81 I mount cross rods 85, which may be thrust under the clips, thereby holding the board firmly and preventing rotation of the posts, while at the same time permitting the ready slipping of the board from the posts.

The sleeves 79 and 80 are provided at a point below the bosses in the mounting straps with sprockets 86, around which a chain 86ª is passed, so that revolution of either sleeve will revolve the other one through the medium of the sprockets and chain.

One only of the sleeves is shown as equipped with the hand wheel 82, the other sleeve (80) having merely a suitable cap 87 to support it in the mounting strap. The sleeves are prevented from reciprocation in the bosses of the straps by means of collars 79ª pinned thereto, the sprockets being held fast in any desired way.

The mounting straps may also be used for supporting adjustably a pair of side boards 88. These side boards are shown in the several views (Figures 14–16), one of which is the simpler.

Describing this first, it will be noted that the side boards have bracket pieces 89 (Figures 14 and 15), which carry mounting bolts 90. The bolts pass up through elongated slots 91 in the mounting straps, whereby the side boards may be suspended in the desired spaced position and held fast by turning down the nuts 92 on said bolts.

Figure 14:
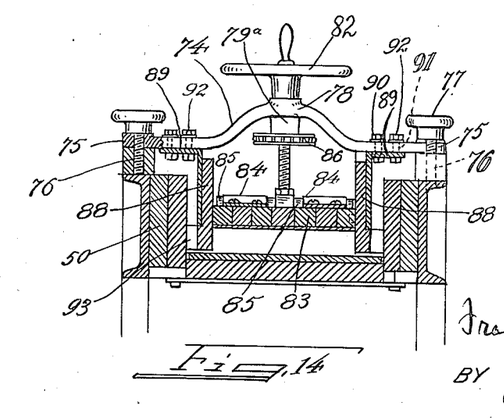
Figure 14 is a vertical section taken on the line 14—14 of Figure 12.
Figure 15:
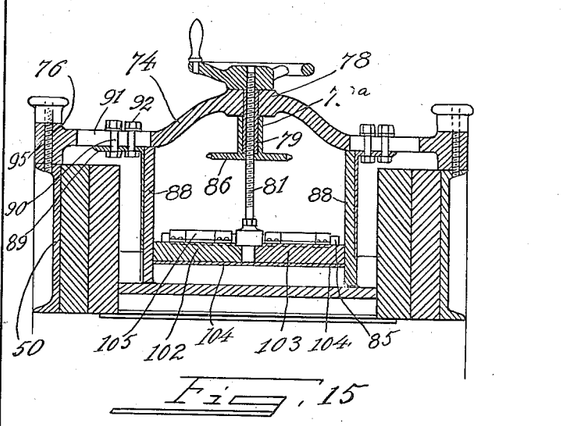
Figure 15 is a like view to Figure 14 showing a different form of pressure board.

In the simpler form of pressure board it is necessary to remove the board and set up a different sized one, when changing the relation of the side pieces, since these side pieces depend alongside of the pressure board and confine the dough passing along with the conveyor to a space bounded by the conveyor on the bottom, the pressure board on the top, and the side pieces on both sides.

In the fully adjustable machine, the pressure board itself is formed in sections, which may be adjusted for width without removing the board. Describing first, however, the adjustable side boards, it will be noted that in Figure 16 the side boards, instead of the brackets 89, are equipped with plates 93, which carry internally threaded bosses 94 at their upper ends.

The straps 74 in all of the adjustable side board machines will preferably have their ends, instead of slotted as at 75 (Figure 12), provided with bosses 95 of considerable length, which said bosses engage over the bolts set into the bed 50, although the first described form may be employed.

Figure 16:
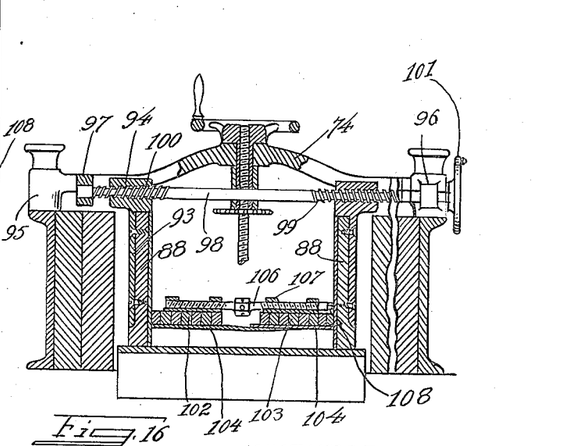
Figure 16 is another like section to Figure 15 with the mounting clips for the board removed, showing the means for adjusting the width of the pressure board, this view also showing a modification of the adjustment for the side boards, together with the pressure board.

In the form including the fully adjustable boards there are formed bosses 96 and 97, one on one of the bosses 95 and the other at a convenient point on the side of the strap, said two bosses serving to support a shaft 98. The shaft 98 has a right and left hand thread 99 and 100, which threads engage within the bosses 94 on the supporting plates of the side boards.

A hand wheel 101 on the shaft 98 serves to impart rotation thereto, thereby adjusting the relative spacing of the side boards.

The pressure board itself (Figures 15–17) is made in the fully adjustable machine in two sections indicated at 102 and 103 with base plates 104 on the two sections which lap each other. The lapping edges will preferably be beveled to retain a smooth lower surface as nearly as possible.

Figure 17:
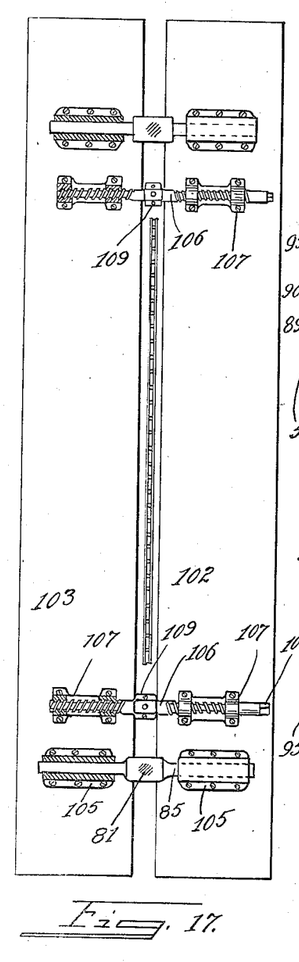
Figure 17 is a top plan view of the pressure board showing the right and left handed screw adjustment and a form of permanent mounting for the board to the supporting posts.

The board sections may both be equipped with the spring clips hitherto described, or else socket pieces 105 may be used in which the cross rods at the lower ends of the board supporting posts engage and are free to slide.

Where in the simpler form of adjustment (Figure 15) the bolts and brackets are used, it is evident that the operator may slide the boards apart, forming the pressure member with the overlapping base plates forming an unbroken base.

It is preferable, however, to provide means for adjustably positioning the boards by means of a threaded member for which purpose I provide right and left hand screws 106 and mount on the upper surface of the board sections, boss plates 107 into the bosses of which the screws engage.

By extending the screws 106 at one end and squaring off the end as at 108, the operator may reach down with a proper tool and force apart or draw together the boards by imparting revolution to the screws.

The operation and obvious advantages of the various pressure board mechanisms will be evident without further special comment.

In connection with the spacing devices for adjusting the width of the board it will be noted that I may equip each left and right hand screw 106 with a central sprocket 109 and connect these sprockets by a chain, so that the adjustment of one screw will bring about a like adjustment to the other.

These adjustments are shown as capable of coupling up with each other since this is a time-saver and in connection with ignorant operatives prevents the unevenness of adjustment which would be bound to occur otherwise.

*The adjustable kneading device.*

While I have shown a kneading board of a simple corrugated nature, and set into the bed 50 in any desired way, I provide in connection with my machine for a fully adjustable or better, fully regulatable, kneading unit.

Figure 18:
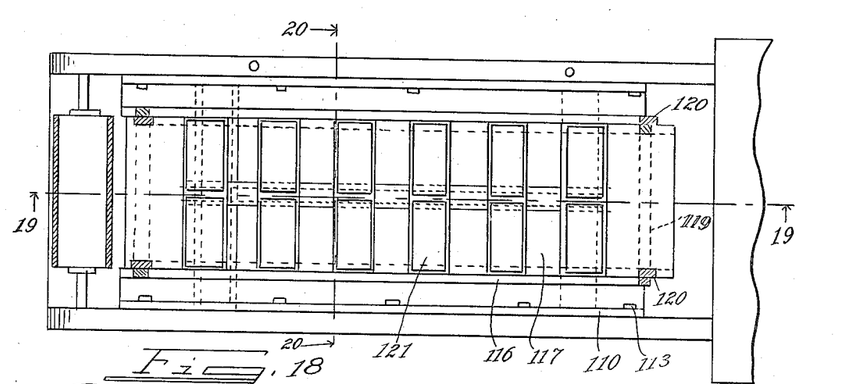
Figure 18 is a plan view of the improved mold board device, a simpler form being shown for purposes of clearness in the preceding views.
Figure 19:
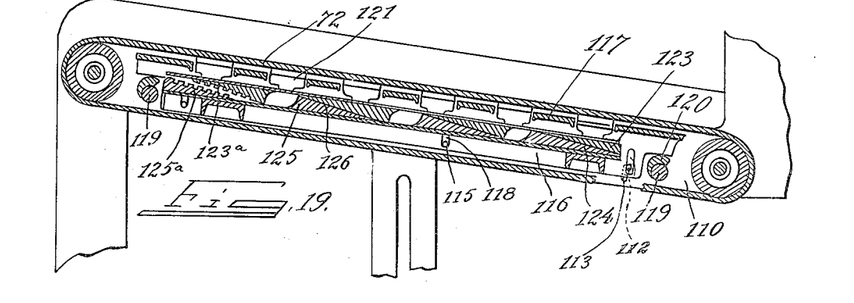
Figure 19 is a section on the line 19—19 of Figure 18.
Figure 20:
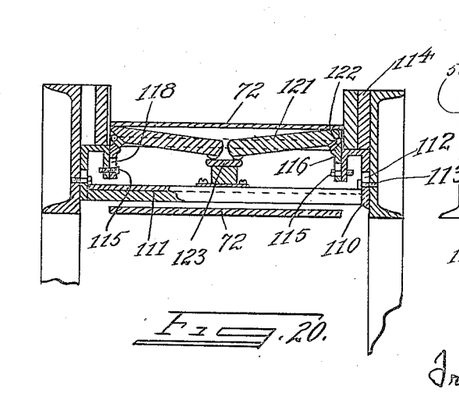
Figure 20 is a detail vertical cross section of the mold board device, on the line 20—20 of Figure 18.

Thus I provide a frame having side members 110 and permanent cross members 111, the sides 110 being slotted at 112 and set over the bolts 113 in the bed 50, such that said sides may be lifted or lowered on said bolts as a guide.

The sides are formed of an inverted channel on which the filler boards 114 will rest, and bolts or pins 115 in the inner members of the channels are arranged so as to engage in slots in a tilting frame.

This tilting frame is made up of side bars 116 and cross bars 117, the slots 118 engaging over the bolts 115.

There are shafts 119, 119, set into the frame at both ends thereof, said shafts having cams 120 thereon which bear on the bars 116, so that a revolution of the shafts will raise either end of the frame as desired.

On the side bars 116, in a position to lie between the fixed cross bars 117 of the tilting frame, I mount a series of bars 121, which are hinged as indicated at 122. These bars extend inwardly toward the center of the device where they rest on an operating slide bar 123.

Dependent upon the position of the bar 123 the relation of the bars 121 and 117 may be regulated, so that the bars 121 may extend above the bars 117 and form with them a corrugated or wavy path for the conveyor belt (hitherto described), or may be lowered to a position substantially parallel.

The sliding bar 123 is formed with inclines 124 on its lower sides, these inclines bearing against a fixed lengthwise member 125 having like inclines 126.

It may be observed that the operator desiring to arrange the kneading surface has the cam controlled side bars of the tilting frame and the sliding inclined bar, which he can adjust and that a large number of different positions and gradations from one to another can be arranged. Thus the bars 123 and 125 are not fixed with relation to the tilting frame, so that the meeting ends of the hinged plates or bars 121 may be thrust up higher than the sides of the tilting frame.

To slide the bar 123 lengthwise, it may be grasped and moved along, the teeth 123$^a$ and 125$^a$ being arranged so that they will hold the two bars in properly adjusted relation. In order to effectively show the toothed parts I have separated the toothed members in Figure 19 of the drawings and I wish it understood that the teeth are in mesh during all positions of the bar 123.

When it is desired to cut down the kneading action at the beginning or end of the path of the loaf as it is carried along by the conveyor 72, I operate the cam shaft to tilt the entire tilting frame at one end or the other. When it is desired to thrust the dough of a loaf or coil as it passes along toward the center or toward the edges, I adjust the sliding bar 123 and thus the hinged bars 121.

I am not aware of any loaf molding machine having adjustments of the kneading action in any such manner as has been described.

Figure 23:
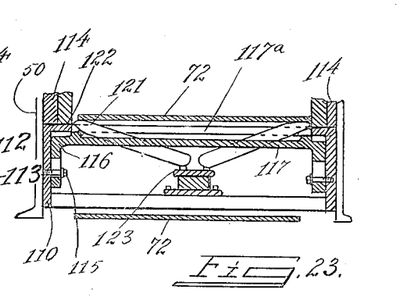
Figure 23 is a like section to Figure 20 of a modification.

In the modification shown in Figure 23 the primary frame portions 110 are brought up straight along the bed 50 and then formed with the cross bars 117$^a$, which form the permanent or fixed contact elements with the conveyor belt 72.

The tilting frame 116 is formed with the same permanent cross bars 117, but these are merely for the purpose of holding together the tilting frame, and lie beneath the bars 117$^a$. The movable cross bars 121 are hinged as before, and the inclined faced bars are used to operate the movable bars.

It may be observed that this structure permits the ends of the movable or hinged cross bars to be brought above or below, or on a level with the bars 117ª, thereby acting to fully level off the contact surface for the conveyor belt or to lie entirely above or entirely below the fixed cross bars 117ª. The showing in Figure 23 is exaggerated to illustrate a wider range of distortion of the conveyor contact surface than would ordinarily be employed.

I have now traced the various adjustments and improvements in my former machine in the order as they act upon a strip of dough passing through and being rolled, coiled, kneaded and formed into a loaf ready for the usual baker's processes.

In connection with the delivery of the completed loaf or coil of dough from the machine I have in the past provided a catch pan 130, into which the loaf falls and from which it is picked up by the operative. It is necessary in adjustable machines particularly that the loaf be guided into the pan without injury, and for this purpose (Figures 21 and 22) I provide a pair of arms 131, 131, swung from the shaft 58 of the end roll of the conveyor belt mechanism.

On these arms is mounted a cross plate 132, which lies close to the surface of the conveyor and rests on the upper edge of the catch pan. This plate thus deflects the loaf into the pan without injury, and when the shaft 58 is adjusted the plate moves along with the shaft, maintaining its proximity or wiping contact with the conveyor and also its contact with the catch pan.

By the machine above described I may make all kinds of coils or loafs of dough for baking, since I can regulate the size of sheet, size of coil, shape of coil and amount of kneading. I can easily get at the inside of the machine where the coil is tripped and the conveyor picks it up, and can easily remove, as well as adjust the pressure board and side boards. These various things I can accomplish in addition to those covered by my earlier patent, to which reference has been made above for a description of the resultant action upon the dough in passing through the various mechanisms which act thereon.

Having thus described my invention, what I claim as new and desire to secure by Letters Patent, is:—

1. In a machine for molding dough, the combination with means for feeding a mass of dough, of sheet forming rolls for forming said dough into a sheet, comprising a pair of rolls of which at least one is movable, a frame for carrying the movable roll, means for adjusting the position of said frame, comprising in part a rotary member and calibrations formed adjacent said rotary member to indicate the position of the said movable roll at different points of adjustment.

2. In a machine for molding dough, the combination with means for feeding a mass of dough, of sheet forming rolls for forming said dough into a sheet, comprising a pair of rolls of which at least one is movable, a frame for carrying the movable roll, means for adjusting the position of said frame, comprising in part a rotary member and calibrations formed adjacent said rotary member to indicate the position of the said movable roll at different points of adjustment, said rotary member comprising an eccentric or cam member, and a member on the frame for engaging said eccentric cam member.

3. In a machine of the character described, the combination with means for feeding a mass of dough, of sheet forming rolls for forming a sheet of the desired thickness from said mass, said means comprising a pair of rolls in proximity to each other, a movable frame carrying one of said rolls, a slantwise post mounted revolubly on the machine, an eccentric or cam member thereon, and a contact face on the frame engaging said eccentric cam member, as and for the purpose described.

4. In a machine of the character described, the combination with means for feeding a mass of dough, of sheet forming rolls for forming a sheet of the desired thickness from said mass, said means comprising a pair of rolls in proximity to each other, a movable frame carrying one of said rolls, a slantwise post mounted revolubly on the machine, an eccentric or cam member thereon, and a contact face on the frame engaging said eccentric or cam member, as and for the purpose described, an indicator point mounted on the frame and calibrations formed on one of the revolving parts, whereby the operator may read the resultant adjustment of the sheet forming roll by means of said calibrations.

5. In a dough molding machine, the combination with means for delivering a mass of dough, of a pair of sheet forming rolls mounted adjacent to each other, one of said rolls having an adjustable mounting, comprising a frame within which the roll is mounted, a revoluble eccentric or cam member mounted on the machine, spring means for forcing the frame into contact with the eccentric or cam member, and means for revolving the eccentric or cam member, whereby the eccentric or cam member is locked by the frictional bind of the frame thereagainst.

6. In a dough molding machine, the combination with means for delivering a mass of dough, of a pair of sheet forming rolls mounted adjacent to each other, one of said rolls having an adjustable mounting, comprising a frame within which the roll is mounted, a revoluble eccentric mounted on the machine, spring means for forcing the frame into contact with the eccentric, and means for revolving the eccentric, whereby the eccentric is locked by the frictional bind of the frame there-against, the mounting means for the eccentric comprising a bar and a post secured to said eccentric, said post and bar forming a couple movable with relation to each other and calibrations on one of said couple, and an indicator on the other, for the purpose described.

7. Means for mounting adjustably one roll of a pair in machines of the character described, comprising a movable frame carrying one of said rolls, a slantwise post mounted revolubly on the machine, an eccentric or cam member thereon, and a contact face on the frame engaging said eccentric or cam member, as and for the purpose described, an indicator point mounted on the frame and calibrations formed on one of the revolving parts, whereby the operator may read the resultant adjustment of the sheet forming roll by means of said calibrations.

8. Means for mounting adjustably one roll of a pair in machines of the character described, comprising a frame within which the roll is mounted, a revoluble eccentric or cam member mounted on the machine, spring means for forcing the frame into contact with the eccentric or cam member, and means for revolving the eccentric or cam member, whereby the eccentric or cam member is locked by the frictional bind of the frame there-against.

9. Means for mounting adjustably one roll of a pair of machines of the character described, comprising a frame within which the roll is mounted, a revoluble eccentric mounted on the machine, spring means for forcing the frame into contact with the eccentric, and means for revolving the eccentric, whereby the eccentric is locked by the frictional bind of the frame there-against, the mounting means for the eccentric comprising a bar and a post secured to said eccentric, said post and bar forming a couple movable with relation to each other and calibrations on one of said couple, and an indicator on the other, for the purpose described.

10. In a dough molding machine, the combination with a kneading portion for the machine, of a traveling conveyor element, rolls for mounting and giving motion to said conveyor element, a flexible member engaging both rolls for driving one from the other, and means for adjusting the tension of the flexible member and of the conveyor element independent of each other.

11. In a dough molding machine, the combination with a kneading portion for the machine, of a traveling conveyor element, rolls for mounting and giving motion to said conveyor element, a flexible member engaging both rolls for driving one from the other, and means for adjusting the tension of the flexible member and of the conveyor element independent of each other and conjointly as well.

12. In a dough molding machine, the combination of a kneading box having a corrugated member, a conveyor belt for passing over said corrugated member, a pair of adjustably spaced rolls over which said belt is passed, and means for driving said rolls comprising power means applied to one of the rolls, and a flexible element passing over and engaging both rolls, and means for tensioning the flexible member independent of the spacing of the rolls.

13. In a dough molding machine, the combination with a kneading box, of a pair of rolls adjustably mounted with relation to each other within said box, a conveyor belt passing over the rolls, sprockets on the rolls, a chain passing over the sprockets, and an adjustable idler sprocket over which the chain passes, for the purpose described.

14. In a dough molding machine, the combination of a corrugated base board, a conveyor belt passing over said board, rolls for mounting and moving the conveyor belt, means for driving one of the rolls, a sprocket chain and sprockets for driving one roll from the other, and an idler chain sprocket engaging the chain and mounting means for said sprocket adjustable with relation to the position of the rolls, as and for the purpose described.

15. In a dough molding machine, the combination of a frame, a pair of adjacent rolls forming a coiling element for a sheet of dough, of a trip belt, means for mounting and moving said trip belt, so as to force out of the pocket between said rolls a coil of dough of desired size, said mounting means being movably mounted in the frame, and an adjustable element secured to the mounting means and serving as a locating member, and a plurality of separate engaging means on the frame for the adjustable element adapted to hold it in fixed position, whereby the different engaging means provide a pre-arranged adjustment and the adjustability of the said element provides special adjustment of said trip belt mounting means.

16. A trip belt construction for machines of the character described, comprising a shaft, a frame pivoted to said shaft, a roll on said shaft, and another roll carried by said frame, a belt passing over said rolls, a pivotal rod or the like secured to the frame, a threaded element on the rod, and a fitting on the machine having a plurality of interspaced members for engagement with the threaded element, for the purpose described.

17. The combination with the frame of a machine of the character described, said frame having an opening therein, a mounting means for a trip belt device mounted within said opening, said mounting means comprising a pivoted framework adapted to swing out through said opening, rolls in said framework for supporting the belt, a handle element for the framework, means for adjustably securing said handle to the frame of the machine to vary the position of the framework, and a latch element adapted to hold the framework when swung out through said opening to expose the interior of the machine.

18. In a dough molding machine or the like, the combination with a conveyor, of a frame through which said conveyor moves, and a pressure board, and means for mounting the pressure board, comprising a plurality of straps removably mounted on the frame, a plurality of posts mounted on the pressure board, means for adjustably supporting the posts in the straps, side boards, and means for mounting said side boards on the straps.

19. In a dough molding machine or the like, the combination with a conveyor, of a frame through which said conveyor moves, and a pressure board, and means for mounting the pressure board, comprising a plurality of straps removably mounted on the frame, a plurality of posts mounted on the pressure board, means for adjustably supporting the posts in the straps, side boards and means for mounting said side boards on the straps, said last noted mounting means being adjustable on the straps.

20. In a dough molding machine or the like, the combination with a conveyor, of a frame through which said conveyor moves, and a pressure board, and means for mounting the pressure board, comprising a plurality of straps removably mounted on the frame, a plurality of posts mounted on the pressure board, means for adjustably supporting the posts in the straps, side boards, and means for mounting said side boards on the straps, said last mentioned mounting means comprising bracket plates on the side boards, and means on the straps, and means on the bracket plates for mutual adjustable engagement, for the purpose described.

21. In a machine of the character described, the combination with a roll, a frame carrying said roll, means for pivotally supporting the frame, so that said roll describes an arc about said pivot upon movement of the frame, a handle pivoted to the frame, a threaded nut on the handle adapted to be set at different positions thereon with relation to the frame, and a loose collar on the nut, said collar having engaging means for a frame supported located member.

22. In a machine of the character described, the combination with an adjustable member for operating on a mass of dough, of a threaded post, connections with the post for controlling the position of the adjustable member, a nut on the post, and a member on the nut with which the nut is freely revoluble, and fixed means on the machine for engaging said last mentioned member, for the purpose described.

23. In a device of the character described, the combination with a travelling member for carrying rolls of dough, of a pressure board, means for retaining the pressure board adjacent the travelling member to exert pressure against the rolls of dough, said means being adjustable, and quick detachable connection between the pressure board and said means.

24. In a device of the character described, the combination with a travelling member for carrying rolls of dough, of a pressure board, means for retaining the pressure board adjacent the travelling member to exert pressure against the rolls of dough, said means being adjustable, and quick detachable connection between the pressure board and said means, said quick detachable means comprising spring clips on the board, and laterally extending rods on the said retaining means.

25. In a device of the character described, the combination with pressure board mounting means, of a pressure board mounted thereon, said pressure board comprising members movable with relation to each other laterally, and means for maintaining the members in desired relation to each other on the mounting means, to expand the width of the said board.

26. In a device of the character described, a pressure board comprising a plurality of sections, means for holding the sections together in desired spaced relations laterally, and base coverings for said sections adapted to overlap each other, whereby a continuous lower surface may be maintained in various spaced relations.

27. In a device of the character described, a pressure board comprising a plurality of sections, means for holding the sections together in desired spaced relations laterally, and base coverings for said sections adapted to overlap each other, whereby a continuous lower surface may be maintained in various spaced relations, said base coverings being tapered at the lapping points.

28. In a device of the character described, the combination with pressure board mounting means, of a pressure board mounted thereon, said pressure board comprising members movable with relation to each other laterally, and means for maintaining the members in desired relation to each other on the mounting means, to expand the width of the said board, said means comprising right and left hand screws, and engaging means for said screws mounted on the said sections.

29. In a device of the character described, a pressure board comprising a plurality of sections, means for holding the sections together in desired spaced relations laterally, and base coverings for said sections adapted to overlap each other, whereby a continuous lower surface may be maintained in various spaced relations, said base coverings being tapered at the lapping points, said right and left hand screws having operative connection between them, whereby operation of one screw operates the others.

30. In a machine of the character described, the combination with a mounting means, of a pressure board thereon adjustable for width, and side boards adapted to lie alongside of the pressure board, said boards being mounted on said mounting device, adjustably for varying their spaced relation.

31. In a machine of the character described, the combination with a traveling member for carrying along rolls of dough, of a pressure board located to press the rolls against the traveling member, and means for adjusting the said board for position with relation to the traveling member, and for width laterally of the traveling member.

32. In a machine of the character described, the combination with a traveling member for carrying along rolls of dough, of a pressure board located to press the rolls against the traveling member, said board being adjustable for width, and side boards to confine the space between the pressure board and the traveling member, said side boards being adjustably spaced for varying their spaced relation.

33. In a machine of the character described, the combination with a traveling member for carrying along rolls of dough, of means for forming confining walls laterally and above the rolls carried by said traveling member, said means being adjustable for width and depth of the confined space.

34. In a machine of the character described, the combination with a traveling member for carrying along rolls of dough, of means for forming confining walls laterally and above the rolls carried by said traveling member, said means being adjustable for width and depth of the confined space, a demountable supporting means on the machine, and means for mounting the confining wall means on said supporting means, whereby the entire structure may be removed from the machine.

35. In a machine of the character described, a mounting means, side boards, and means for mounting the side boards on the mounting means, so as to permit a lateral movement thereof for spaced relations to each other, and a common operating device for effecting the said lateral movements for both boards.

36. In a machine of the character described, a mounting means, side boards, and means for mounting the side boards on the mounting means, so as to permit a lateral movement thereof for spaced relations to each other, and a common operating device for effecting the said lateral movements for both boards, said device comprising a right and left hand screw, and means on the boards to engage the screw.

37. In a device of the character described, the combination with a plurality of depending posts, said posts being adjustable in position, laterally extending rods at the bases of said posts, a pressure board, said pressure board comprising a plurality of sections extending lengthwise thereof, and means on the sections to slidably engage said rods.

38. In a device of the character described, the combination with a plurality of depending screw posts, threaded members on fixed pivots adapted to engage the threaded portions of said posts to adjust them for position, laterally extending rods on the lower ends of said posts, a pressure board comprising a plurality of sections extending lengthwise thereof, and a means on the sections to engage said rods in a slidable relation.

39. In a device of the character described, the combination with a plurality of depending posts, said posts being adjustable in position, laterally extending rods at the bases of said posts, a pressure board, said pressure board comprising a plurality of sections extending lengthwise thereof, and means on the sections to slidably engage said rods, and means to engage each section and adapted to hold it in desired adjusted relation to the others.

40. In a device of the character described, the combination with a plurality of depending posts, said posts being adjustable in position, laterally extending rods at the bases of said posts, a pressure board, said pressure board comprising a plurality of sections extending lengthwise thereof, and means on the sections to slidably engage said rods, and means to engage each section and adapted to hold it in desired adjusted relation to the others, said means comprising screw threaded members and means on the sections to engage them.

41. In a device of the character described, the combination with a plurality of depending posts, said posts being adjustable in position, laterally extending rods at the bases of said posts, a pressure board, said pressure board comprising a plurality of sections extending lengthwise thereof, and means on the sections to slidably engage said rods, and means to engage said sections and adapted to hold them in desired adjusted relation to the others, said means comprising screw-threaded members and means on the sections to engage them, and means connecting the screws for conjoint operation.

42. In a dough molding machine, the combination with a kneading portion for the machine, of a traveling conveyor element, rolls for mounting and giving motion to said conveyor element, a flexible member engaging both rolls for driving one from the other, and means for adjusting the tensions of the flexible member independent of the spacing of the rolls.

43. In a dough molding machine, a trip belt device, comprising a pair of rolls, one fixed, a frame swung on the axis of the fixed roll, with the other roll carried by said frame, and means for adjusting the position of the frame, comprising a member on the frame, a threaded element on the member, and a freely revoluble piece on the threaded element, and means on the machine adapted to engage the freely revoluble piece.

44. In a dough molding machine, a trip belt device, comprising a pair of rolls, one fixed, a frame swung on the axis of the fixed roll, with the other roll carried by said frame, and means for adjusting the position of the frame, comprising a member on the frame, a threaded element on the member, and a freely revoluble piece on the threaded element, and means on the machine adapted to engage the freely revoluble piece, said means being adapted to present engaging devices to the revoluble piece at a plurality of positions, for the purpose described.

45. In a machine of the character described, means for adjusting the position of a roll carried by a swinging frame, comprising a post on the frame, a threaded nut device on the post adapted to take different positions thereon, a freely revoluble element on the nut device, and means on the machine for engaging said freely revoluble member in a plurality of positions.

46. In a machine of the character described, means for adjusting the position of a roll carried by a swinging frame, comprising a post on the frame, a threaded nut device on the post adapted to take different positions thereon, a freely revoluble element on the nut device, and means on the machine for engaging said freely revoluble member in a plurality of positions, said means comprising a portion of the machine frame having a plurality of interspaced notches therein, and a pair of radial pins extending from the freely revoluble member, as and for the purpose described.

47. In a machine of the character described, means for adjusting the position of a roll carried by a swinging frame, comprising a post on the frame, a threaded nut device on the post adapted to take different positions thereon, a freely revoluble element on the nut device, and means on the machine for engaging said freely revoluble member in a plurality of positions, said means comprising a portion of the machine frame having a plurality of interspaced notches therein, and a pair of radial pins extending from the freely revoluble member, said machine frame portion having spring fingers arranged alongside the notches to engage over the ends of the pins, when seated in the notches, as and for the purpose described.

48. In a machine of the character described, the combination with a kneading bed, of supporting means detachably mounted on the bed, depending posts on the supporting means, a pressure board member and means on the pressure board member and the posts forming a quick detachable connection between them.

49. In a machine of the character described, the combination with a kneading bed, of a plurality of cross pieces having slotted ends, bolts with nuts on the bed to engage said slotted ends, posts depending from the cross pieces, pins on the ends of the bolts, and releasable socket members to engage said pins, as and for the purpose described.

50. In a machine of the character described, the combination with a conveyor to carry rolls of dough beneath a pressure member, of a corrugated member adapted to lie beneath the belt, the means for adjusting the angular relation of said corrugated member with relation to the pressure board.

51. In a machine of the character described, the combination with a flexible conveyor to carry rolls of dough beneath a pressure member, of a corrugated member adapted to lie beneath the conveyor, and means for raising one end or the other of the corrugated member, so as to vary the lengthwise angle thereof with relation to the pressure member.

52. In a machine of the character described, a kneading board, co-operative with a pressure member and a flexible conveyor, comprising a support for a series of interspaced cross members, and a series of hinged members lying between said cross members, and means for varying the position of the hinged members on their hinge pivots.

53. In a machine of the character described, the combination with a pressure member and a flexible conveyor, of a kneading board, comprising a support, a frame tiltable on said support, and a series of cross members hinged on said frame, said support having means for moving the said cross members on their hinges.

54. In a kneading board for use with a machine of the character described, the combination, in part, of a support, and a series of corrugation-forming cross members hinged at their outer ends to the support, and meeting at their inner ends, and means for engaging said inner ends and lifting and lowering them to alter the corrugation-forming character of the said cross members.

55. In a kneading board for use with a machine of the character described, the combination, in part, of a support, and a series of corrugation-forming cross members hinged at their outer ends to the support, and meeting at their inner ends, and means for engaging said inner ends and lifting and lowering them to alter the corrugation-forming character of the said cross members, said means comprising a shiftable bar, and inclines on said bar and on the support for moving the bar up and down upon endwise movement thereof.

56. In a kneading board for use with a machine of the character described, the combination, in part, of a support, and a series of corrugation-forming cross members hinged at their outer ends to the support, and meeting at their inner ends, and means for engaging said inner ends and lifting and lowering them to alter the corrugation-forming character of the said cross members, said means comprising a shiftable bar, and inclines on said bar and on the support for moving the bar up and down upon endwise movement thereof, one of said inlines for the bar and the support having teeth thereon, to lock the bar in adjusted lengthwise positions.

57. In a kneading board for use with machines of the character described, a corrugating-forming means, and means in connection therewith for varying the corrugations in a range between a convex and a concave kneading surface.

58. In a kneading board for use with machines of the character described, a corrugating-forming means, and means in connection therewith for varying the corrugations in a range between a convex and a concave kneading surface, and for eliminating the corrugations for desired lengthwise portions of the said forming means.

59. A scraper device for the receiving rolls of a machine of the character described, comprising in combination with the rolls, a pair of scrapers, one for each roll, and common means for lifting said scrapers from the rolls, for the purpose described.

60. A scraper device for receiving rolls of a machine of the character described, comprising in combination with the rolls, a pair of scrapers, one for each roll, and shafts mounting said scrapers, arms on the shafts, and common means for rocking said arms to lift the scrapers simultaneously from the rolls.

61. A scraper device for receiving rolls of a machine of the character described, comprising in combination with the rolls, a pair of scrapers, one for each roll, and shafts mounting said scrapers, arms on the shafts, and common means for rocking said arms to lift the scrapers simultaneously from the rolls, said arms on the shafts having grooved ends, and the common means comprising a shaft having a right and left hand thread to engage said common means, as and for the purpose described.

62. In combination with a conveyor delivering rolls of dough from a machine of the character described, a roller for the conveyor adjustable in position in the machine, a delivery pan to catch the rolls of dough as they pass over the conveyor roller, arms hung from the roll and a deflector element mounted on said arms and adapted to lie on the delivery pan, for the purpose described.

63. In combination with a conveyor delivering rolls of dough from a machine of the character described, a roller over which the conveyor passes, a delivery pan to catch the rolls of dough as they pass over the conveyor roller, and a deflection element movable with the roller, and adapted to lie over the delivery pan, for the purpose described.

64. In combination with a conveyor delivering rolls of dough from a machine of the character described, a roller over which the conveyor passes, a delivery pan to catch the rolls of dough as they pass over the conveyor roller, and a deflection element movable with the roller, and adapted to lie over the delivery pan, for the purpose described, said deflection member comprising a plate adapted to lie against the conveyor on said roller.

65. In combination with a conveyor delivering rolls of dough from a machine of the character described, a roller for the conveyor adjustable in position in the machine, a delivery pan to catch the rolls of dough as they pass over the conveyor roller, arms hung from the roll and a deflector element mounted on said arms and adapted to lie on the delivery pan and engage the conveyor as it passes over the roller in all positions of the roller, for the purpose described.

FRANK X. LAUTERBUR.